D. R. BOWEN AND C. F. SCHNUCK.
MACHINE FOR TREATING RUBBER AND SIMILAR MATERIAL.
APPLICATION FILED SEPT. 18, 1917.
1,400,934.
Patented Dec. 20, 1921.
2 SHEETS—SHEET 1.
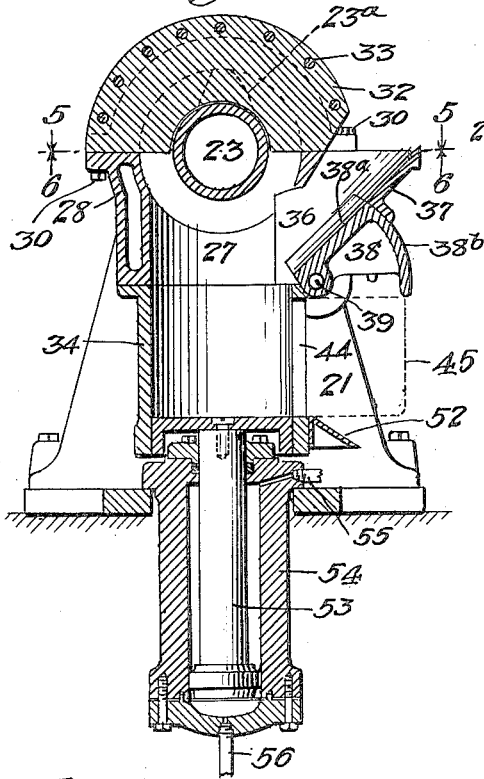
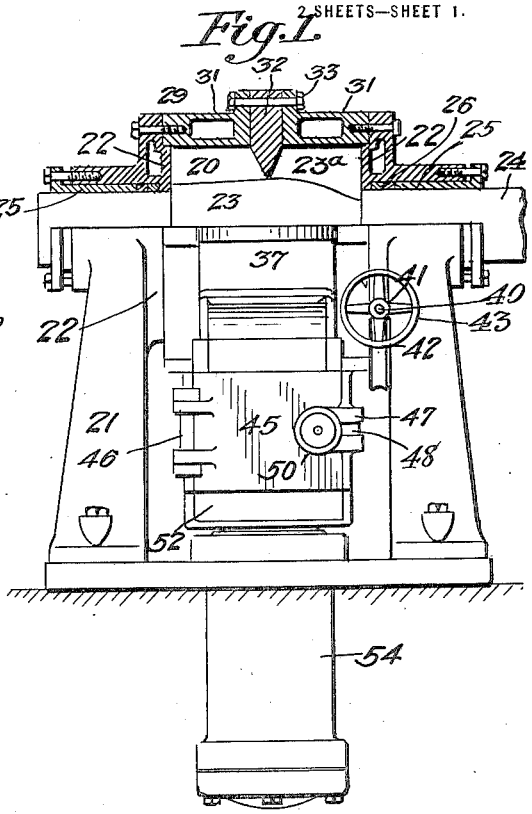
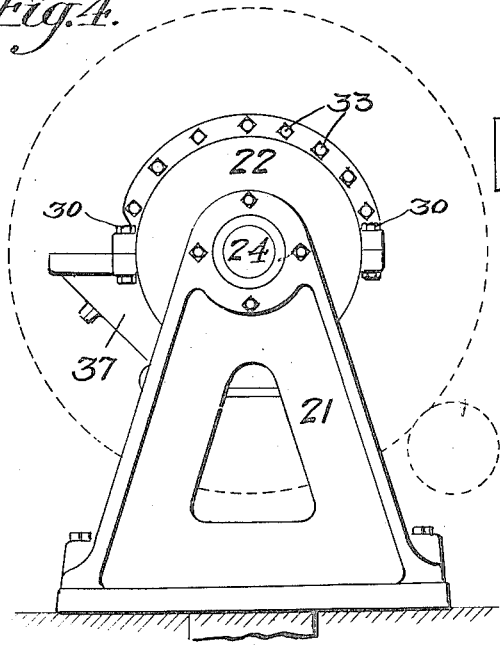
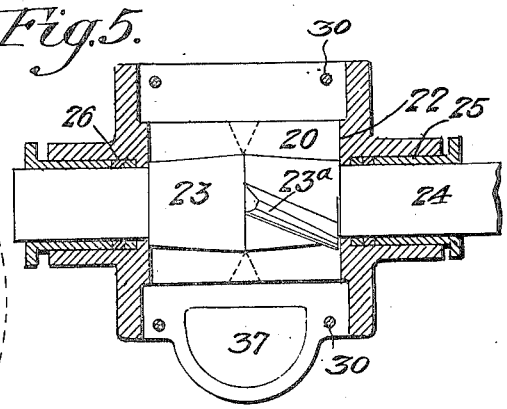
Inventors:
D. R. Bowen and C. F. Schnuck,
by
Attorney.

D. R. BOWEN AND C. F. SCHNUCK.
MACHINE FOR TREATING RUBBER AND SIMILAR MATERIAL.
APPLICATION FILED SEPT. 18, 1917.
1,400,934.
Patented Dec. 20, 1921.
2 SHEETS—SHEET 2.
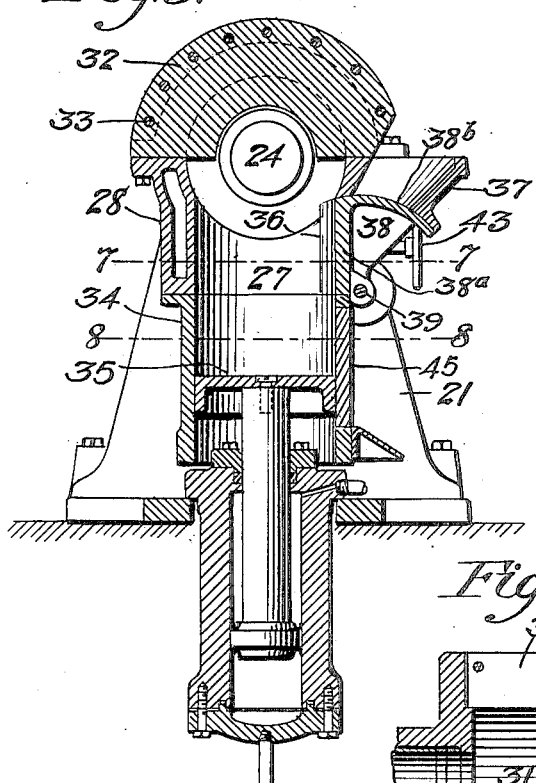
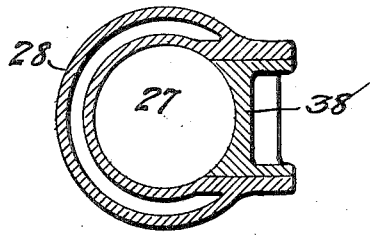
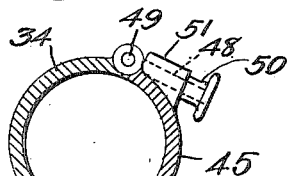
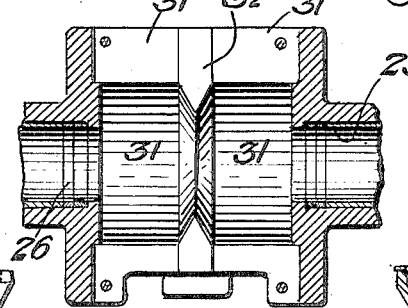
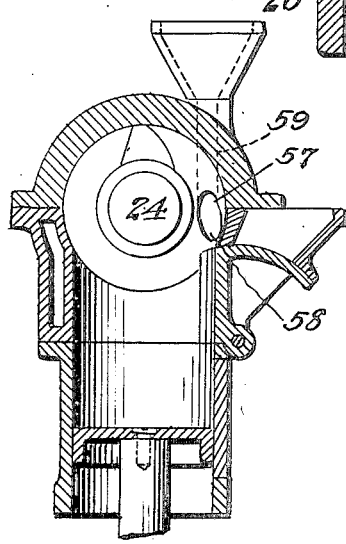
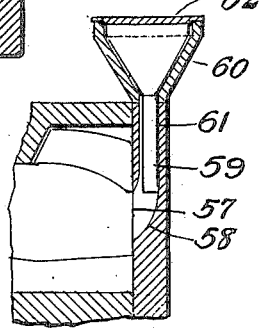

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

MACHINE FOR TREATING RUBBER AND SIMILAR MATERIAL.

1,400,934.     Specification of Letters Patent.     Patented Dec. 20, 1921.

Application filed September 18, 1917. Serial No. 192,030.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines for Treating Rubber and Similar Material, of which the following is a full, clear, and exact description.

This invention relates to machines for treating rubber and similar material, and it has particular reference to machines for masticating, working, kneading or mixing rubber which is to be used for various industrial purposes. Our improved machine is particularly intended to act on a mixture of various materials of which the particles vary considerably in character, size and consistency and reduce it to a smooth, readily workable, plastic mass in which the distribution of the several ingredients is uniform throughout. The machine may be very advantageously used, for example, in reducing to a smooth, uniform, plastic mass a mixture of rubber chunks of various sizes, pieces of tar, and filling or coloring material in powdered form, although it will be obvious from the following description that we do not limit ourselves to this particular use and that the machine will be of utility in the working, mastication or mixing of different kinds of plastic material.

One of the primary objects of our invention is the production of a machine of the character stated, in which the working chamber containing the agitating element or rotor can be very conveniently charged and discharged. This working chamber is usually of generally cylindrical form with a single rotor working therein; but our invention is not limited in all its aspects to such an arrangement, as certain features are applicable to a machine of the duplex or multiplex type, in which there is a plurality of rotors.

Another object of our invention is to furnish a rubber working or mixing machine which is of very compact construction, and more particularly to provide a structure in which part of the mechanism is located below the floor level, thereby conserving the working space above the floor level and permitting ready access to the working chamber. By our improved construction, the upper part or cap piece of the working chamber can be removed with great facility for inspecting or repairing the chamber itself or the rotor contained therein.

Another object of our invention is to furnish a machine of considerable capacity in which the total height is reduced to a minimum by a novel arrangement of parts.

We also have in view the production of a machine in which the charging opening for the working chamber is located between the chamber and the main portion of the cylinder or guide for the pressure plunger or ram, whereby valuable space is economized, said charging opening being preferably controlled by a suitable closure or valve which effectively prevents the escape of the treated material from the charging opening during the operation of the machine.

Other objects of the invention are to provide means whereby filling or coloring matter or other material may be added to the batch in the mixer during operation without the necessity of arresting the action of the rotor; to provide a transverse abutment or rib in the chamber wall which coöperates with the rotor in causing the extrusion of the material and which can nevertheless be readily detached from the chamber wall for the substitution of a new rib or abutment in case the first one becomes worn, or in the event that it is desired to change over to a rib or abutment of somewhat different cross-section, to vary thereby the kneading or working action on the rubber; and to improve the general construction and operation of machines of the class indicated.

To these and other ends, the invention consists in the novel features, parts, and combinations of parts to be hereinafter described and claimed.

Reference is to be had to the accompanying drawings forming part of this specification, wherein—

Figure 1 is a front elevation of a machine embodying our improvements, with the upper part of the machine shown in longitudinal section;

Fig. 2 is a vertical, transverse section of the machine with the charging and discharging openings respectively in the open condition;

Fig. 3 is a view similar to Fig. 2 with both openings closed;

Fig. 4 is a partial end elevation of the machine;

Fig. 5 is a section on line 5—5 of Fig. 2, looking down showing the rotor in place;

Fig. 6 is a section on the same line, looking up the rotor being omitted;

Figs. 7 and 8 are sections on lines 7—7, and 8—8, respectively, of Fig. 3.

Fig. 9 is a fragmentary longitudinal section of a machine having a supplementary charging opening for the addition of coloring material or the like; and Fig. 10 is an end elevation partly in section, of parts shown in Fig. 9.

The particular machine selected for illustration in Figs. 1 to 8 inclusive, is characterized by a generally cylindrical mixing chamber supported horizontally somewhat above the floor level and having journaled therein an approximately central mixing element or rotor adapted to be driven by power suitably applied to the rotor shaft. This machine is intended to be charged at the side, or perhaps more correctly at the front, and discharged at the bottom, for which purpose the mixing chamber is provided at its lower part adjacent to the front of the machine with a charging opening into which the material to be treated is introduced, while below the working chamber is arranged the vertically movable piston or ram which, when raised, holds the material in contact with the rotor so that it will be acted on effectively thereby, and which when lowered permits the discharge of the mixing chamber in a downward direction. At least a portion of the fluid pressure mechanism for actuating the pressure piston or ram is preferably located below the floor level so it is out of the way of the workmen. The pressure piston or ram in this instance not only has the function of holding the material forcibly in contact with the rotor, but it also acts in the nature of a discharging door or closure, because when it is lowered the treated material will drop down with it into a position in which it can be readily removed from the machine, usually through an opening in the side wall of the cylinder in which the piston or ram operates. Many of these features, however, are susceptible of considerable modification without departure from the scope of our invention as defined in the claims.

In the example illustrated, a mixing chamber 20 of generally cylindrical shape is mounted between suitable standards, pedestals or end frames 21 having integral heads 22, which close the cylinder at the respective ends. The end frames and the body portion of the cylinder may be conveniently connected in any suitable manner, as by means of bolts. A rotary mixing element or rotor 23 is provided within the mixing chamber in a substantially central location, said rotor having a horizontal shaft 24 with bearings 25 in the respective end frames. We make no claim herein to the construction of the bearings as the same are claimed in another application, but it may be said that the bearings are preferably formed directly in adjustable stuffing boxes having packing 26 around the shaft to prevent the escape of the treated material from the working chamber even when such material is subjected to very high pressure. The chamber of cylinder 20 is completely closed in at the top but is provided at the bottom with a discharge opening 27 formed in a casting 28 which constitutes approximately the lower half of the chamber. The chamber is divided diametrically, in the present example, into the lower section 28 and the upper section 29, said sections being detachably interconnected by means of bolts 30. The upper section 29 is of composite structure in the present instance, being constituted by two end pieces 31 and an intermediate piece 32. The intermediate piece 32 is preferably bolted between the pieces 31 by bolts 33, and at its inner part it projects into the working chamber to present a transverse rib, abutment or constriction of the general nature described in our co-pending application, Serial No. 191,413. The parts 31 and 32 constitute the cap section of the chamber, forming in conjunction a unit which is set in between the cylinder heads and superimposed on the lower chamber section 28, from which position it can be readily removed when the fastening bolts are taken out. The removal of the cap piece or cover can be readily effected, and when it has been taken off, the rotor and the interior of the working chamber are accessible for inspection or repairs. In the particular form shown, rib 32 corresponds in length to the width of the cap piece. In other words, its ends are flush with the opposite lower edges of the cap piece. In the present instance, the lower chamber section 28 is not provided with a rib, the only rib employed being of semi-circular form and being carried by the cap piece exclusively, but various changes may be made in this regard without departing from the invention. We have shown the upper and lower chamber sections as of water jacketed construction, to permit the use of a heating or cooling fluid, but this is unessential. The rotor is also shown as of hollow construction for the same purpose, but this is not material to our invention. The lower chamber section 28 is supported on the upper end of a cylinder or closed guide 34 for a pressure piston or ram, 35, the opening 27 of the lower chamber section being in line with that of the cylinder, so that the piston or ram can move up into the lower chamber section in close proximity to the rotor blade or blades and thereby hold the material in contact with such blade or blades so that it will be worked effectively thereby. In the form shown, a charging opening 36 is formed in the section 28 at the front of the machine, said opening being located at the lower part of a hopper 37. A part of section 28 forms in effect a continuation of the cylinder 34 and in the example shown, the charging opening 36 is located in the side wall of the cylinder thus provided at the front of the machine. This charging opening is controlled by a suitable closure which may be constituted by a swinging gate or valve 38 fixed to a rock shaft 39 supported in suitable brackets. The swinging closure 38 comprises a concavo-convex wall 38$^a$, which is adapted to snugly fit and close the opening 36, and it also comprises a concavo-convex wall 38$^b$ working in a cut-away portion of the hopper 37 and adapted to close off the lower portion of the hopper. In Fig. 2, the closure 38 is swung to its outer position so as to open the hopper and the charging opening 36. In Fig. 3, the closure is in the closed position. It may be actuated conveniently by means of an operating shaft 40 suitably mounted on one of the pedestals 21 and having a worm 41 engaging a worm wheel 42 fixed to the rock shaft 39. The operating shaft 40 can be turned by a hand wheel 43.

The hopper is preferably inclined as shown, so that its axis is approximately tangent to the working cylinder, and the direction of rotation of the rotor is such that the incoming material introduced through the charging opening enters behind the rotor blades hereinafter described and aids rather than impedes the rotation thereof.

In the example shown, the cylinder 34 is provided at the front of the machine beneath the charging opening 36 with a discharge opening 44, which can be closed by a swinging door 45. Preferably the door 45 will swing in a horizontal plane as distinguished from the vertical swinging movement which is preferably given the valve or closure 38, but considerable variation can be made in details of this nature. In the example shown, the door 45 is hinged at one side of the opening 44 by a hinge including a pintle 46, and at the opposite or free edge of the door a locking device 47 is provided, which in this instance includes a horizontally swinging bolt 48 on cylinder 34, pivoted at 49 and having a nut 50 adapted to engage a slotted lug 51 on the edge of the door. Adjacent the lower edge of the door a shelf 52 may be fixed to the frame of the machine to facilitate the removal of the material from the interior of the cylinder after the mixing operation has been completed.

By preference, the piston or plunger 35 is operated hydraulically, for which purpose it is provided with a downwardly extending piston rod 53, working in a hydraulic cylinder 54. Preferably, the hydraulic cylinder will be located below the floor level, with its upper end disposed between the pedestals 21. Suitable connections 55—56 permit the raising and lowering of the piston 35 in a manner which it will not be necessary to describe in detail. In its lowermost position, the upper face of the piston will preferably be substantially flush with the lower edge of the discharge opening 44. The construction is also preferably such that while the piston can move into the closed position approximately to the rotor blades in the cylindrical part of the lower chamber section, it cannot actually contact with said blades. The rotor blades 23$^a$ may be of substantially the same shape and operate in the same general way as those described in our co-pending application previously identified. They extrude the material through the restricted space between the rotor and the inner edge of the rib 32, which rib in this instance is substantially semi-circular in shape and is carried wholly by the upper chamber section as previously described.

The operation of the machine is substantially as follows:

Supposing the parts to be in the position shown in Fig. 2, the door 45 is closed and locked, and the rubber or other material to be treated is charged into the cylinder 34 through the hopper and charging opening 36. The valve 38 is then closed and the pressure piston or ram is raised so as to carry the material up in the cylinder 34 and in the lower part of casing section 28 into contact with the blades of the rotor, which at this time is in rotation. Thus, the piston or ram carries the material into the working position, and, the fluid pressure on the ram being continued, the latter not only holds the material in proximity to the blades, but forces it into very tight contact therewith, so that the rotor will have a very thorough kneading or working action. The piston or ram is held in the elevated position quite close to the rotor blades throughout the mixing operation. The mixing or masticating action of the machine, shown in the drawings, is similar to that described in the co-pending application previously mentioned. The blades at opposite sides of the rib 32 smear the mass against the side wall of the cylinder, and at the same time force it toward the center. The rib in connection with the rotor presents an arcuate extrusion space or opening through which the material is extruded alternately in opposite directions by the blades, being thoroughly worked from one end of the cylinder to the other while under considerable pressure. When the treated mass has become plastic and homogeneous throughout, and it is desired to discharge the machine, the piston or ram is lowered by a manipulation of the fluid pressure valves in a manner which it will not be necessary to describe, and the treated material drops down into the cylinder with the piston. The rotation of the rotor is continued, and the material which adheres to the rotor is then stripped off by striking one end of the transverse rib (the left hand end, as shown in Fig. 2), there being no longer sufficient pressure on the material to cause it to pass between the inner edge of the rib and the rotor. The stripped off material falls down on to the piston as the latter descends and by the time the piston reaches its lowermost position shown in Fig. 2, the treated material will be practically all deposited on the upper surface of the piston back of the door 45. The door 45 then being opened, the material can be readily taken out of the cylinder 34 into a suitable receptacle or the like placed in proximity to the shelf 52.

It will be seen from the foregoing that our improved machine is of very simple construction, very compact and easy to operate. Access can be had to the working chamber without disturbing the pressure piston or ram in any way. The machine can be made of very convenient height, the hopper 37 being very readily accessible as well as the discharging opening 44. A very efficient machine can be designed in which the pressure piston has a comparatively short travel. The pressure piston, as will be noted, not only serves the function of feeding the material into the chamber and holding it against the rotor, but it also acts as a discharge door or closure, which, when lowered, discharges the mixing chamber. This combination of functions is of considerable value and it is one of the important advantages which is derived from placing the pressure piston below the working cylinder rather than above it. Of course we do not limit ourselves in all aspects of our invention to a construction in which the pressure piston has a strictly vertical movement, as it might have a movement at an angle to the vertical without sacrificing any of the advantages of the invention.

In Figs. 9 and 10, we have shown a modification of the construction involving a supplementary charging opening by means of which filling or coloring matter can be added to the batch during the mixing. In spite of the fact that the batch of material is subjected to relatively heavy pressure by the pressure piston or ram, the spaces at the back of the rotor blades are not completely filled with material. The rotation of the rotor causes an empty space to form back of the blade. We find that filling or coloring material or the like, which is usually in powdered form, can be added to the batch during mixing, if it is injected into the vacant space or spaces back of the blade or blades. In doing this, we prefer to provide a port-hole 57 in one of the cylinder heads at a point which is immediately adjacent one of the end edges of the blades or blades at some time during the rotation of such blade or blades. The port-hole 57, which is relieved on the lower side, as shown at 58, to permit the rubber to slide by and the pigment to slide into the chamber, communicates with a substantially upright bore 59 in the cylinder head leading from a charging hopper 60.

Fig. 9 shows the inclination of the wall of the lower part 58 of the port-hole, which facilitates the sliding of the rubber mass past the hole and the injection of the pigment into the mass. In the hopper 60 and bore or duct 59, an agitator 61 of suitable form may be provided for stirring the pigment or other material to be added and preventing it from becoming clogged in the hopper or in the passage leading downwardly therefrom. In the form shown, the agitator 61 comprises a cap piece 62 adapted to rest on the upper edge of the hopper and having a sheet metal plate extending down into and fitting against the side wall of the hopper and the duct 59. By rotating the agitator, the material will be scraped off any portion of the charging device to which it adheres so that gradually it will be taken into the mixing chamber and added to and mixed with the batch of material therein.

We have discovered that a machine of the character shown may be advantageously charged or fed from the end during the rotation of the mixing blades and even while a body of material acted on by the blades is being pressed against them by a piston, or ram, owing to the existence of one or more low pressure areas, or voids at the chamber end, behind the rotor blade, or blades. Into such a low pressure area, or void, material to be treated may be charged readily by gravity, and such material need not necessarily be in powder form, as various changes in the procedure herein described may be made without departing from the scope of our invention.

One of the advantages of the removable rib construction described in connection with Figs. 1 to 8 inclusive, is that the rib may be made of especially hard wear-resisting material without the necessity of making the whole cap piece of that material. Furthermore, by the construction described, the rib may be readily removed for grinding or refinishing or for the substitution of a new rib of the same or somewhat different cross-section.

It will be obvious that, so far as the broad aspects of our invention are concerned, the charging opening 36 and the closure therefor are not material, because the machine can be operated with the opening 36 closed, permanently or otherwise. In such event, the batch of material to be treated will be charged or introduced into the cylinder 34 through the door opening 44. In this case, the opening 44 will serve as a charging opening as well as a discharge opening for the cylinder or charging device 34 or its equivalent. The opening 27 serves, of course, as a charging and discharging opening for the mixing or working chamber.

It will be understood that in referring to a "cylinder" for charging or discharging the machine we use the word in a broad sense and do not limit ourselves to a construction in which the charging or discharging device has a container or chamber of round cross-section as distinguished from a cross-section of different shape. Again, we do not intend to limit ourselves to a machine in which the charging or discharging "cylinder" is formed separately from the working chamber, nor to a machine in which such "cylinder" is integral with the working chamber, as various changes may be made in features of this nature without departing from the scope of our invention as defined in the claims.

We do not claim broadly herein the working chamber provided with supporting pedestals, the pedestals being provided with extended sides to form the ends of the chamber and the chamber having a hinged discharge section extending between the chamber ends or other features of construction claimed in our application, Serial No. 423,365; neither do we claim broadly herein a rubber working machine having a chamber consisting of a single cylinder provided with a discharge opening at the bottom thereof and a rotor for working the material back and forth in the cylinder or other features claimed in our copending application, Serial No. 458,222.

What we claim is:

1. In a machine of the character described, a mixing chamber, and means including a removable, transverse constriction in the chamber for causing extrusion of the material from one portion of the chamber into another.

2. In a machine of the character described, a working chamber having a constricted portion intermediate of its ends, said constricted portion being removable, and a working element in said chamber constructed and arranged to extrude the material through said constricted portion alternately in opposite directions.

3. In a machine of the character described, a working chamber having a transverse rib, a rotor coöperating with said chamber and said rib, said rib formed as a separate piece of hard, wear-resisting material.

4. In a rubber mixer, a working chamber having a transverse rib, a rotor coöperating with said rib, and means for securing the rib detachably to the chamber wall.

5. In a rubber mixer, a working cylinder having a detachable extrusion rib.

6. In a rubber mixer, a working cylinder having a detachable, transversely arranged extrusion rib intermediate of its ends on the side wall thereof.

7. In a rubber mixer, a working cylinder, a transverse extrusion rib of wear-resisting material, and means for securing said rib detachably to the side wall of said cylinder.

8. In a rubber mixer, a working cylinder horizontally arranged, a rotor in said cylinder, said cylinder divided diametrically into upper and lower sections, and the upper section divided transversely intermediate of its ends.

9. In a rubber mixer, a horizontally arranged working cylinder, a rotor therein, said cylinder divided longitudinally into upper and lower sections, one of said sections divided transversely, and an extrusion element to coöperate with the rotor, interposed between the parts of said last-named section.

10. In a machine of the character described, a horizontally arranged working cylinder, a rotor therein, said cylinder divided longitudinally into an upper section and a lower section, the upper section being divided transversely, and a member to coöperate with the rotor in the extrusion of the material, interposed between and secured to the parts of the transversely divided upper cylinder section.

11. In a machine of the character described, a working chamber, a bladed mixing element therein, and a movable member adjacent the lower part of said chamber for feeding the material against the mixing element when said member is in one position, and for discharging the material from the chamber when said member is in another position.

12. In a machine of the character described, a mixing chamber having an opening in the lower part thereof, a rotary mixing element in said chamber, and movable means positioned in said opening for permitting the discharge of the material through said opening and for forcing the material upwardly into the chamber to hold it in contact with said rotary mixing element.

13. In a rubber working machine, a combined pressure piston and discharge door.

14. In a machine of the character described, a working chamber having an opening in the lower part thereof, a rotor in said chamber, and a combined pressure piston and discharge door operating in said opening.

15. In a rubber mixing machine, a working chamber supported above the floor level, a bladed mixing element in said chamber, and mechanism located at least partly below the floor level for feeding the material upward in the mixing chamber against said bladed element and for controlling the discharge of the machine.

16. In a rubber mixing machine, a horizontally arranged working chamber having an opening in the lower part thereof, a bladed element in said chamber for mixing the material therein, and a vertically movable piston or ram in said opening adapted to press the material against said bladed element when said piston or ram is in one position, and to permit the discharge of the machine when said piston or ram is in another position.

17. In a rubber mixing machine, a working chamber, a rotor therein, an upwardly movable pressure piston and discharge door in the lower part of said chamber, and means for operating said piston and discharge door.

18. In a rubber mixing machine, a working chamber, a rotor therein, a cylinder at the lower part of said chamber through which the material is adapted to be discharged, and a piston working in said cylinder.

19. In a rubber mixing machine, a working chamber, a rotor therein, a cylinder at the lower part of said chamber through which the material is adapted to be discharged, and a piston working in said cylinder having a lateral discharge opening.

20. In a rubber mixer, a working chamber, and means for carrying upward into said chamber the material located beneath the same.

21. In a rubber mixing machine, a working chamber, and a cylinder and piston for feeding the material into said chamber in a generally upward direction.

22. In a rubber mixing machine, a working chamber, and a cylinder and piston for charging the material into and controlling its discharge from said chamber.

23. In a rubber mixing machine, a working chamber having an opening in the lower portion, and a single device for charging the chamber through said opening and permitting the discharge of the material from the chamber through said opening.

24. In a machine of the character described, a working chamber, a feed and discharge cylinder arranged beneath the same and having a lateral opening, and a piston working in said cylinder adapted to receive material placed in said cylinder through said opening and to carry it upward into the working chamber.

25. In a machine of the character described, a working chamber, a feeding cylinder arranged vertically beneath the same, a vertically movable piston in said cylinder adapted to carry the material upward into said chamber, and a door through which material can be charged into said cylinder on top of said piston.

26. In a machine of the character described, a working chamber, a charging cylinder communicating therewith, a piston in said cylinder, said cylinder having a charging opening, a closure for said opening, and means for holding said closure in the closed position to prevent escape of the material through said opening under the pressure of the piston.

27. In a machine of the character described, a working chamber, a charging cylinder therefor, a piston working in said cylinder, said cylinder having a lateral opening past which the piston travels, and means for securely closing said opening to prevent escape of the material under the pressure of the piston.

28. In a machine of the character described, a working chamber, a charging cylinder therefor having an opening in its side wall, a piston working in said cylinder, and a swinging closure for said opening.

29. In a machine of the character described, a working chamber, a charging cylinder communicating therewith, a piston working in said cylinder, said cylinder having an opening intermediate of the limits of the piston travel, and a closure for said opening adapted to conform to the piston and to prevent escape of the material through said opening under pressure of said piston.

30. In a machine of the character described, a working chamber, a substantially upright feed and discharge cylinder arranged beneath the same and communicating therewith, and a piston working in said cylinder, the latter being provided with a charging opening and a discharging opening.

31. In a machine of the character described, a working chamber, a substantially upright feed and discharge cylinder arranged beneath the same and communicating therewith, and a piston working in said cylinder, the latter being provided with a lateral opening, and means for closing said opening.

32. In a machine of the character described, a working chamber, a substantially upright feed and discharge cylinder arranged beneath the same and communicating therewith, and a piston working in said cylinder, the latter being provided with a lateral opening, and a hopper associated with said opening.

33. In a machine of the character described, a working chamber, a rotor therein for working the material back and forth against the inner surface of said chamber, a charging hopper formed on the chamber for the introduction of the material to be treated, and means whereby said hopper may be placed in and cut off from communication with the working chamber.

34. In a machine of the character described, a working chamber, a charging cylinder therefor, a piston operating in said cylinder, a hopper formed on said cylinder through which the material moves by gravity into the same and means for closing off the hopper from the working chamber.

35. In a machine of the character described, a working chamber, a charging cylinder beneath the same, a piston adapted to carry the material upward in said cylinder into said chamber, and a hopper through which the material is charged into said cylinder.

36. In a machine of the character described, a chamber, a charge container formed thereon having a movable bottom element.

37. In a machine of the character described, a charge container into which the material to be charged may be fed by gravity, having a bottom element movable to charge the machine.

38. In a machine of the character described, a material receiving chamber, a hopper with an inclined wall, and a swinging member associated with said hopper adapted to cut off the same from said chamber.

39. In a machine of the character described, a material receiving chamber, a hopper with an inclined wall, and a swinging member associated with said hopper adapted to cut off the same from said chamber, said swinging member associated with the inclined side wall of the hopper.

40. In a machine of the character described, a material receiving chamber, a hopper adjacent thereto, and a movable side wall member for the hopper adapted to cut it off from said chamber and to place it in communication therewith.

41. In a machine of the character described, a material receiving chamber, and a hopper associated therewith having a movable hopper wall adapted to hold the material or to close off the chamber.

42. In a machine of the character described, a working chamber, and a combined charging and discharging device therefor.

43. In a machine of the character described, a working chamber having an open lower portion, and means for charging and discharging the machine through said lower open portion.

44. In a machine of the character described, a working chamber having a common charging and discharging opening, and a movable member associated with said opening whereby the machine may be charged and discharged.

45. In a machine of the character described, a working chamber, a rotor therein for working the material back and forth, said chamber having a common charging and discharging opening, and a movable member associated with said opening whereby the chamber may be closed during operation and discharged.

46. In a machine of the character described, a working chamber, a rotor therein for working the material back and forth, said chamber having a common charging and discharging opening, and a movable member associated with said opening whereby the chamber may be closed during operation and discharged, and means for operating said movable member.

47. In a machine of the character described, a working cylinder having a discharge opening in its side wall, and mechanical means for feeding the charge into the machine under pressure at the same side of the machine on which said discharge opening is located.

48. In a machine of the character described, a working chamber, a rotor therein for working the material in a generally lengthwise direction, and means for charging and discharging said chamber at one and the same side of the machine.

49. In a machine of the character described, a working chamber, a rotor therein for working the material back and forth while in contact with the chamber wall, said chamber having provision for charging and discharging it at the same point.

50. In a rubber mixer the combination of a mixing cylinder, a rotor therein for working the material back and forth, and means for conducting the charge to and discharging the cylinder at substantially the same point in its circumference.

51. In a rubber mixing machine, a working chamber having a discharge opening, and means to charge the machine through said opening.

In witness whereof we have hereunto set our hands on the 14 day of September, 1917.

DAVID R. BOWEN.
CARL F. SCHNUCK.